July 13, 1926.

W. H. AYDELOTTE

BAKING AND DRYING OVEN

Filed May 11, 1922 6 Sheets-Sheet 1

INVENTOR
W. H. Aydelotte,
BY
E. W. Anderson
ATTORNEYS

Patented July 13, 1926.

1,592,414

UNITED STATES PATENT OFFICE.

WILLIAM H. AYDELOTTE, OF NIAGARA FALLS, NEW YORK, ASSIGNOR TO THE SHREDDED WHEAT COMPANY, OF NIAGARA FALLS, NEW YORK, A CORPORATION OF NEW YORK.

BAKING AND DRYING OVEN.

Application filed May 11, 1922. Serial No. 560,173.

Figure 1:
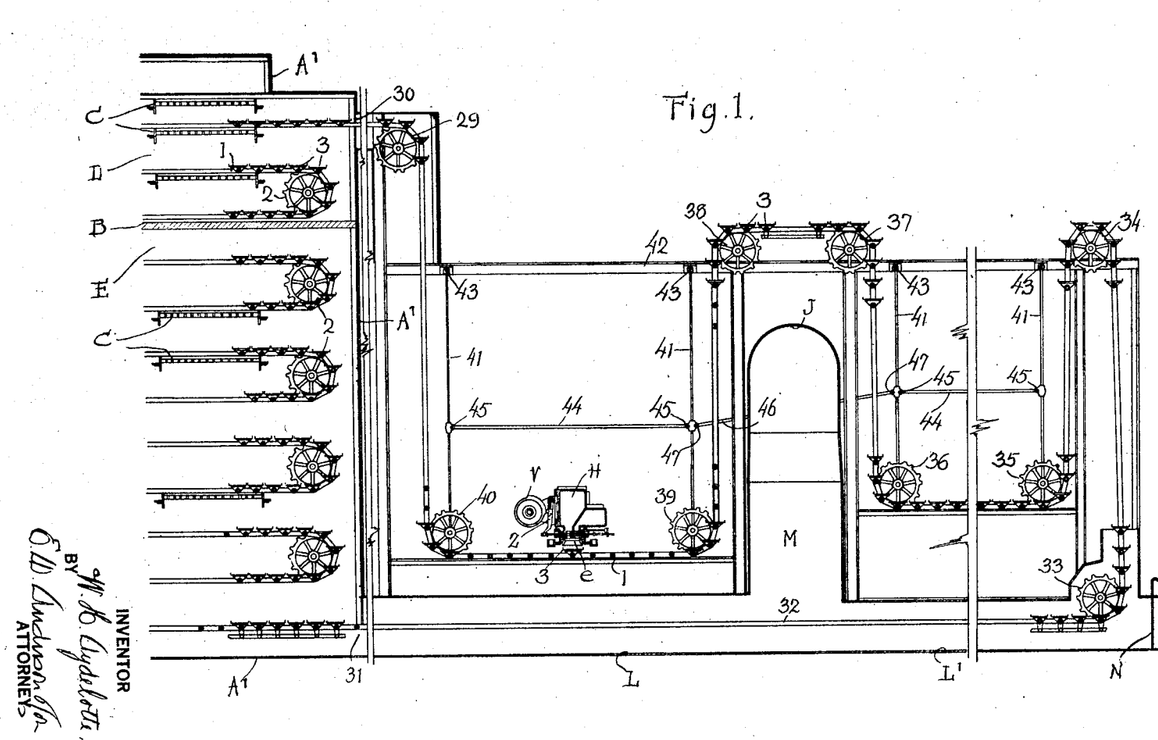
Figure 1 is a side view partly in section and partly broken away of a portion of the invention, namely of one end of the baking and drying oven.
Figure 2:
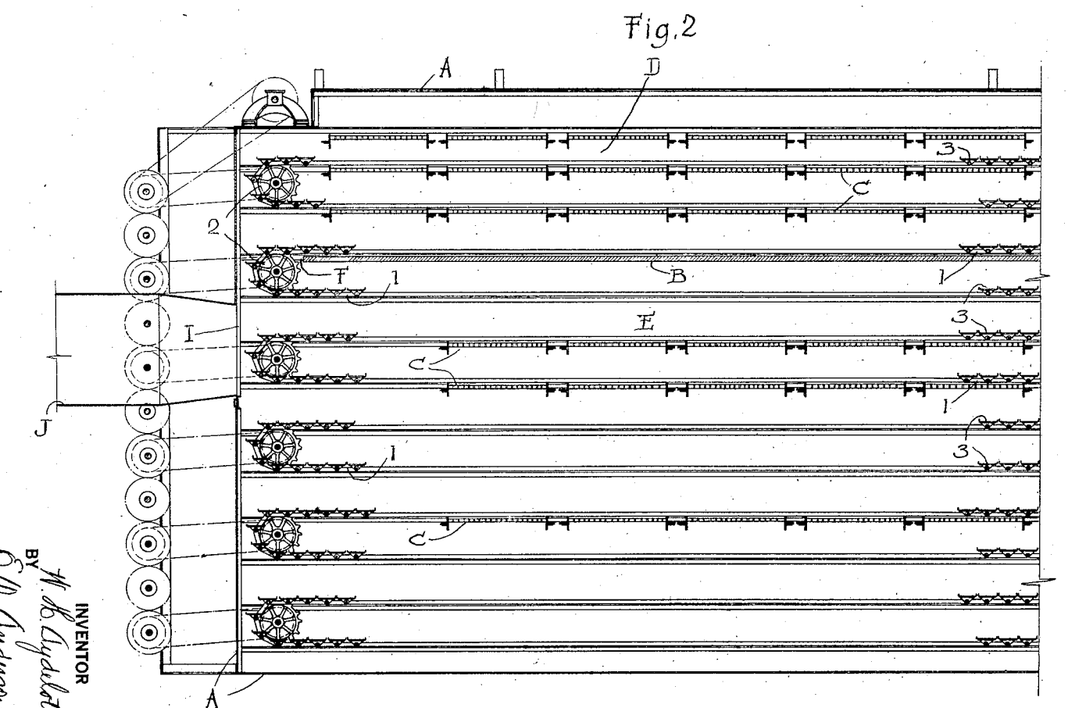
Figure 2 is a similar view of the other end of the oven.
Figure 3:
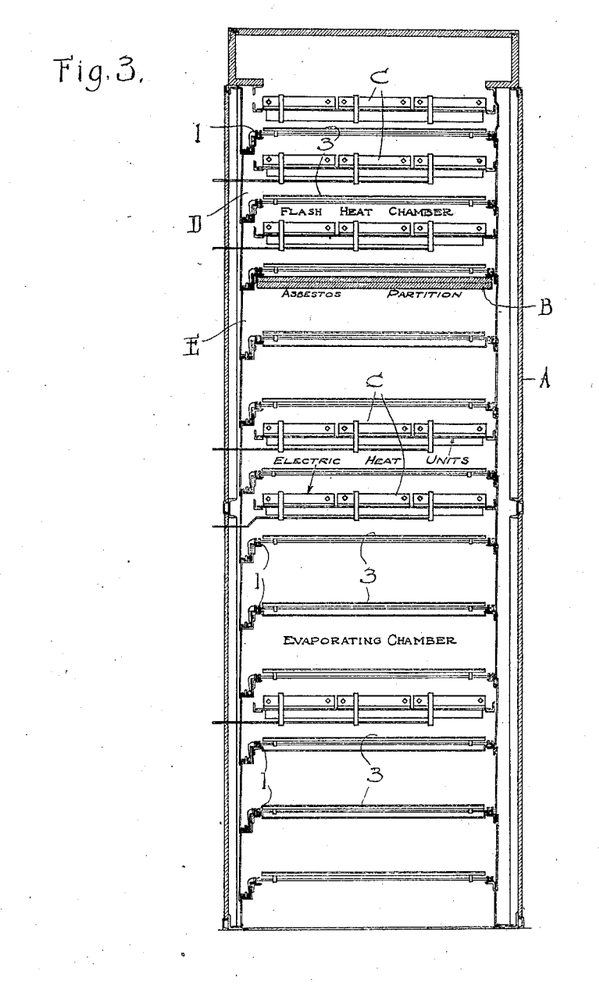
Figure 3 is a transverse vertical section of the oven, upon the line A—A, Figure 5.
Figure 4:
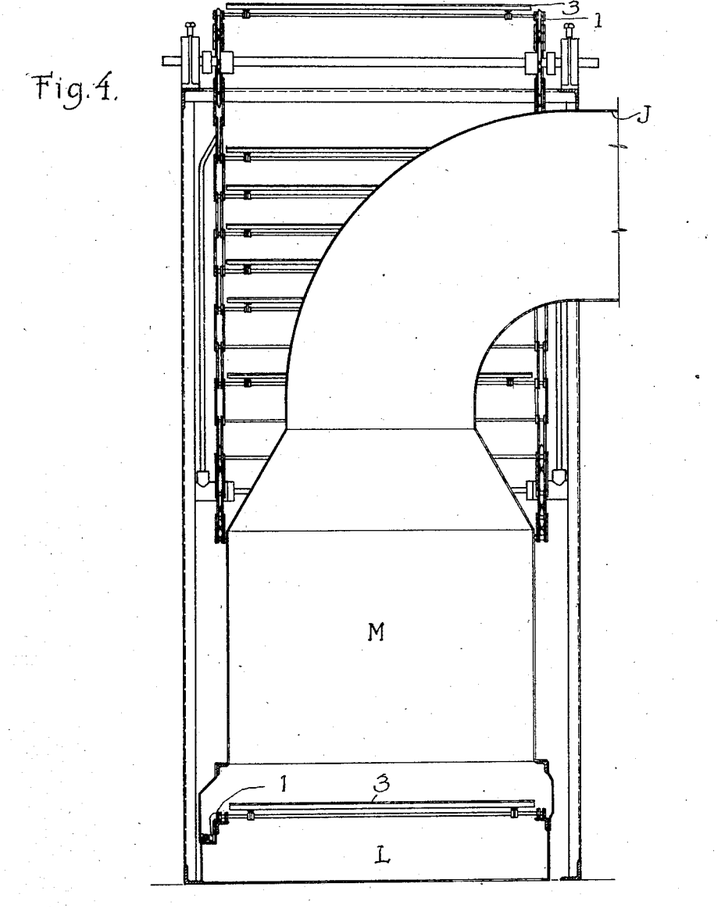
Figure 4 is a similar view taken through the discharge of the main conduit, the section being taken on the line B—B, Figure 5.
Figure 5:
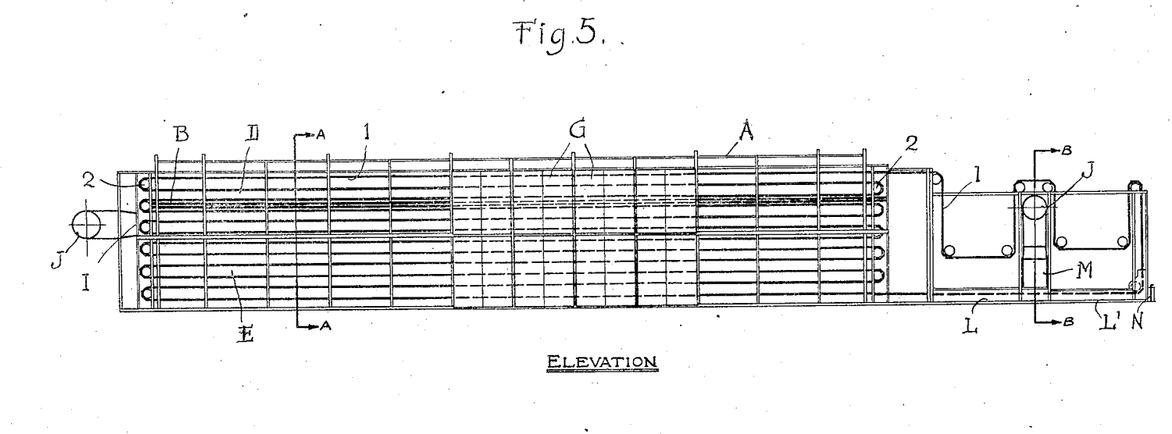
Figure 5 is a side view of the invention, with parts removed.
Figure 6:
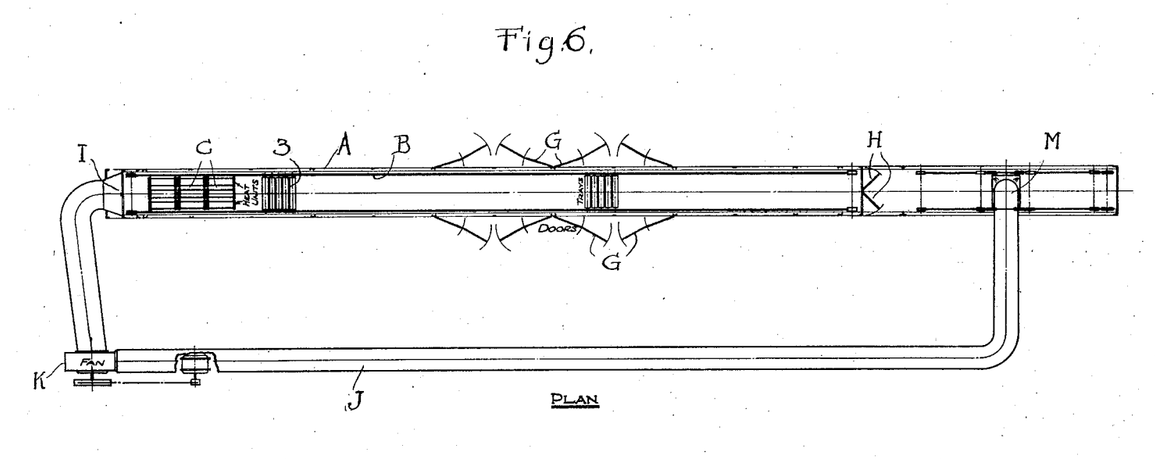
Figure 6 is a plan view of the invention with parts broken away and partly diagrammatic.

The invention has relation to baking and drying ovens used in the manufacture of cereal products.

It has never heretofore been possible to manufacture cereal filamentous biscuit without breaking the continuity of the mechanical operation for the purpose of baking the biscuit and thereafter drying the same to an extent admitting of the packing directly into cartons, it having been necessary to deposit the green biscuit upon trays as in the Patent No. 678,625 of July 16, 1901, and to remove the trays to a baking oven, and to remove the trays from said oven to an evaporator, as in the Patent No. 746,145 of December 8, 1903.

It is an object therefore of this invention to provide a baking and drying oven, upon the conveyor of which are deposited directly the green biscuit from the machine of the first named patent, and to bake and dry the biscuit in a continuous automatic manner and to produce the biscuit ready to be packed directly into the cartons following the removal of the baked and dried biscuit from said conveyor.

The invention also relates to baking and drying processes for cereal products, having a similar object. Other objects and advantages will appear.

The invention consists in the novel construction and combinations of parts as well as in the novel procedure or associated steps set forth in the appended claims.

In the accompanying drawings illustrating an embodiment of the invention, and of a means for carrying out the process, A designates the oven casing, having a horizontal partition B, dividing the same into an upper shallow chamber and a lower comparatively deep chamber, both chambers being electrically heated by units C, C, arranged in greater number or more compactly in the upper than in the lower chamber, whereby the former is more highly heated than the latter. The heating units C' are also arranged more compactly in the upper than in the lower parts of the respective chambers.

The biscuit are conveyed first through the upper chamber D, and thereafter through the lower chamber E, by an endless conveyor chain 1, having a plurality of horizontal stretches and passing over end sprocket wheels 2; and 3 are the trays or receptacles of said chain whereon the biscuit are deposited previous to entry into the oven, as will appear from the co-pending application S. No. 560,134, filed May 11, 1922, the co-pending application S. No. 552,037 being referred to for the detail structure of the chain conveyor, the conveyor having a length in and a path through the lower or drying chamber at least twice its length in and path through the upper or baking chamber.

The biscuit deposited upon the conveyor, are passed thereby upwardly into the upper or "flash heat" chamber at 30, and are conveyed back and forth longitudinally of said chamber sufficiently to bake and brown the biscuit, each stretch of the conveyor chain, from the upper stretch downward, lying under its heating element C' at a progressively increasing distance. Inasmuch as the upper and lower chambers are separated from each other by the insulated partition B, with some small exception as at F, where the conveyor passes from the upper to the lower chamber, a large portion of the moisture content of the biscuit, evaporated therefrom in the upper or baking chamber will be confined therein substantially until the end of the "run" or operation of the oven in baking and drying a definite quantity of biscuit. As a result of the aforesaid, the biscuit deposited upon the conveyor, are caused to travel first continuously through the upper more highly heated portion of the upper chamber and then continuously through lower progressively less heated portions thereof, and thereafter at first continuously through the more highly heated upper portion of the lower chamber and then continuously through lower progressively less heated portions thereof. The oven is provided with lateral doors G, and with doors H at one end, which may be opened should occasion arise or at the end of the said "run".

The biscuit having been carried by the conveyor from the upper into the lower chamber are passed along the latter longitudinally for a sufficient number of times back and forth to dry the biscuit or to evaporate therefrom the major part of the moisture content not evaporated in the upper or baking chamber, this evaporation or drying in the lower "evaporation" chamber being materially assisted by establishing a circulation of the comparatively dry air therein by suitable means, in the present instance the air being drawn off from one end of the lower chamber E at I, through conduit J, and reintroduced into the opposite end of said chamber at 31, the circulation of the air being continuously maintained by the fan K in said conduit, and being an important part of the evaporating process.

The conveyor 1 carrying the baked biscuit upon the trays 3 thereof, emerges from the oven at 31, and thence passes horizontally at 32 through lower horizontal conduit L, and beneath the discharge mouth M of the conduit J, the air being discharged from the latter conduit downwardly upon the baked biscuit, and serving to complete the evaporating process, the air thence passing through said lower conduit L to said opening 31, where it is reintroduced into the lower chamber E, and while passing along said lower conduit serving also to further dry the biscuit preliminary to the final drying thereof as the biscuit pass the mouth M of the conduit J. The air so discharged upon the baked biscuit is moving at a greater speed than that of the circulation of the air in the lower chamber E, and has consequent increased drying influence upon the biscuit, and being discharged downwardly upon the biscuit, has no tendency to lift the biscuit from the conveyor. The air current moving through the lower conduit L has also similarly greater speed and increased drying effect upon the biscuit.

The conduit L is extended past the mouth M at L' and incloses the lower stretch 32 of the conveyor at this end, and the sprocket wheel 32 of the conveyor, the latter thence passing upwardly to the sprocket wheel 34, a valve N being provided at the forward end of the conduit L'.

The conveyor chain 1 is made up of twelve stretches each stretch being about seventy feet in length in the oven and drier casing, this great length of chain conveyor being made necessary to admit of the requisite continuity of the baking and drying process in attaining the objects hereinbefore stated.

Two vertical loops are formed in the conveyor 1, which as it emerges from the oven is extended horizontally at 32, to sprocket wheels 33, thence upwardly to sprocket wheels 34, thence downwardly to sprocket wheels 35, thence horizontally to sprocket wheels 36 to form the lower stretch of one of said loops, the conveyor passing thence upwardly to sprocket wheels 37 to complete the first loop, the conveyor passing thence horizontally to sprocket wheels 38, thence downwardly to sprocket wheels 39, thence horizontally to sprocket wheels 40 to form the lower stretch of the second loop, and thence upwardly to sprocket wheels 29 to complete the second loop and through entrance opening 30 leading to the upper or baking chamber of the oven casing, a downwardly projecting hood 30' guarding said entrance opening against escape of heat from said chamber and forming an entrance passage for said conveyor.

The two loops formed as stated, are suspended from certain of said sprocket wheels, and the sprocket wheels in the lower bends of the loops are suspended from rods 41, depending from frame 42 and pivotally connected thereto at their upper ends at 43, each pair of the rods 41 having connection rod 44, pivotally connected thereto at 45, and the adjacent rods 41 of the two loops having connection rod 46, pivotally connected thereto at 47.

The means for depositing the biscuit upon the conveyor include a feed conveyor having links e, in communication with suction chamber H, and valve plates actuated by cams V, and arms Z, as fully described in said first named patent.

I claim:—

1. The process of baking and drying filamentous cereal biscuit, consisting in passing the same in continuous succession through an oven to bake the biscuit and evaporate the major part of the moisture content thereof, and maintaining a circulation of the air in the oven, and discharging a current of more rapidly moving air upon the baked biscuit.

2. The process of baking and drying filamentous cereal biscuit, consisting in passing the same in continuous succession through a highly heated oven to bake the biscuit and partially evaporate the moisture content thereof, and thereafter passing the biscuit through a less highly heated oven to evaporate the major part of the remaining moisture content, and maintaining a circulation of the air in the last named oven and discharging a current of more rapidly moving air upon the baked biscuit.

3. A process for baking and drying cereal filamentous biscuit, consisting in initially moving the biscuit continuously through a zone of relatively high temperature to bake the biscuit, and thereafter continuously moving the biscuit through a plurality of zones of progressively decreasing temperatures to dry the biscuit, and maintaining a circulation of the air in the last named zones and finally discharging a current of more rapidly moving air upon the baked and dried biscuit.

4. A process for baking and drying cereal filamentous biscuit, consisting in initially moving the biscuit continuously through a plurality of zones of relatively high progressively decreasing temperatures to bake the biscuit, and thereafter continuously moving the biscuit through a plurality of zones of progressively decreasing temperatures to dry the biscuit, and maintaining a circulation of the air in the last named zones and finally discharging a current of more rapidly moving air upon the baked and dried biscuit.

5. In a baking and drying oven, a casing provided with a partition dividing the same into two chambers, means for conveying biscuit first through one of said chambers and thereafter through the other chamber, means for heating the first named chamber to a high degree and the other chamber to a lower degree, and means for maintaining a circulation of the air in the last named chamber and for discharging a current of more rapidly moving air upon the baked biscuit.

6. In a baking and drying oven, a casing provided with a partition dividing the same into two chambers, means for conveying biscuit first through one of said chambers and thereafter through the other chamber, means for heating the first named chamber to a high degree and the other chamber to a lower degree, and means for maintaining a circulation of the air in the last named chamber and for discharging a current of more rapidly moving air downwardly upon the baked biscuit.

7. In a baking and drying oven, a casing provided with a horizontal partition dividing the same into an upper chamber and a lower chamber, means for conveying biscuit first through the upper chamber and thereafter through the lower chamber, means for heating the upper chamber to a high degree and the lower chamber to a lower degree, and means for maintaining a circulation of the air in the lower chamber and for discharging a current of more rapidly moving air upon the baked biscuit.

8. In a baking and drying oven, a casing provided with a horizontal partition dividing the same into an upper chamber and a lower chamber, means for conveying biscuit first through the upper chamber and thereafter through the lower chamber, means for heating the upper chamber to a high degree and the lower chamber to a lower degree, and means for maintaining a circulation of the air in the lower chamber and for discharging a current of more rapidly moving air downwardly upon the baked biscuit.

9. In a baking and drying oven, a casing provided with a partition dividing the same into two chambers, means for conveying biscuit first through one of said chambers and thereafter through the other chamber, means for heating the first named chamber to a high degree and the other chamber to a lower degree, and means for maintaining a circulation of the air in the last named chamber and for discharging a current of more rapidly moving air upon the baked biscuit including a lower horizontal conduit for the conveyor and comunicating with the lower chamber at one end thereof, a main conduit having an intake at the other end of the lower chamber and a discharge into said lower conduit, and a fan.

10. In a baking and drying oven, a casing provided with a horizontal partition dividing the same into an upper chamber and a lower chamber, an endless conveyor passing first through the upper chamber and thereafter through the lower chamber, means for heating the upper chamber to a high degree and the lower chamber to a lower degree, and means for maintaining a circulation of the air in the lower chamber and for discharging a current of more rapidly moving air upon the baked biscuit including a conduit for the conveyor and communicating with the lower chamber at one end thereof, a main conduit having an intake at the other end of the lower chamber and a discharge into the first named conduit, and a fan.

11. In a baking and drying oven, a casing provided with a horizontal partition dividing the same into an upper chamber and a lower chamber, an endless conveyor passing first through the upper chamber and thereafter through the lower chamber, means for heating the upper chamber to a high degree and the lower chamber to a lower degree, and means for maintaining a circulation of the air in the lower chamber and for discharging a current of more rapidly moving air upon the baked biscuit, including a lower conduit for the conveyor and communicating with one end of the lower chamber, a main conduit having an intake at the other end of the lower chamber and a discharge into said lower conduit, and a fan.

12. In a baking and drying oven, a casing provided with a horizontal partition dividing the same into an upper chamber and a lower chamber, an endless conveyor passing first through the upper chamber and thereafter through the lower chamber and without the same at the same end of the oven through which it entered, means for heating the upper chamber to a high degree and the lower chamber to a lower degree, and means for maintaining a circulation of the air in the lower chamber and for discharging a current of more rapidly moving air downwardly upon the baked biscuit including a lower horizontal conduit for the conveyor, a main conduit having an intake at one end of the lower chamber and a discharge into said lower conduit, and a fan, said lower conduit being continued past said discharge and having a valve.

13. In a baking and drying oven, a casing provided with a horizontal partition dividing the same into upper and lower chambers, an endless conveyor having a plurality of horizontal stretches located in said upper chamber and a plurality of horizontal stretches located in said lower chamber, and a plurality of heating elements in said upper chamber, located at increasing distances above successive lower conveyor stretches, said conveyor being adapted to convey biscuit continuously through the oven along successively lower stretches.

14. In a baking and drying oven, a casing provided with a horizontal partition dividing the same into an upper chamber and a lower chamber, an endless conveyor chain having a plurality of horizontal stretches for conveying biscuit first through the upper chamber and thereafter through the lower chamber, means for heating the upper chamber to a high degree adapted to bake the biscuit and means for heating the lower chamber to a lesser degree adapted to dry the biscuit, said upper chamber being adapted to retain therein moisture given off by the biscuit, and means for maintaining a circulation of a given body of air in said lower chamber adapted to prevent loss thereof.

15. In a baking and drying oven, a casing provided with a horizontal partition dividing the same into an upper chamber and a lower chamber, an endless conveyor chain having a plurality of horizontal stretches for conveying biscuit first through the upper chamber and thereafter through the lower chamber, means for heating the upper chamber to a high degree adapted to bake the biscuit and means for heating the lower chamber to a lesser degree adapted to dry the biscuit, and means for drawing off air from one end of said lower chamber and reintroducing the same at the other end thereof to thereby maintain a circulation of the air in the drying chamber.

16. In a baking and drying oven, a horizontally elongated casing provided near the top thereof with a horizontal partition dividing the same into an upper shallow chamber and a lower comparatively deep chamber, electrical heating elements disposed in the two chambers and adapted to heat the upper chamber to a baking degree and the lower chamber to a lesser degree, an endless conveyor having a plurality of horizontal stretches and adapted to convey biscuit first continuously through the more highly heated portion of the upper chamber and then continuously through progressively less heated portions thereof and thereafter at first continuously through the more highly heated portion of the lower chamber and then continuously through lower progressively less heated portions thereof, said conveyor having a length in and a path through the lower chamber at least twice its length in and path through the upper chamber and having a looped portion located without said casing, said lower chamber having a horizontal extension underlying said looped portion of the conveyor, said conveyor passing through said extension and emerging therefrom to said looped portion, and said upper chamber having an entrance opening provided with a hood, the looped portion of the conveyor passing through said hood to said opening.

17. In a baking and drying oven, a horizontally elongated casing provided near the top thereof with a horizontal partition dividing the same into an upper shallow chamber and a lower comparatively deep chamber, electrical heating elements disposed in the two chambers and adapted to heat the upper chamber to a baking degree and the lower chamber to a lesser degree, an endless conveyor having a plurality of horizontal stretches and adapted to convey biscuit first continuously through the more highly heated portion of the upper chamber and then continuously through lower progressively less heated portions thereof and thereafter at first continuously through the more highly heated portion of the lower chamber and then continuously through lower progressively less heated portions thereof, said conveyor having a length in and a path through the lower chamber at least twice its length in and path through the upper chamber, and air circulation means for withdrawing the air from one end portion of said lower chamber and reintroducing the same at the opposite end portion of said chamber.

18. In a baking and drying oven, a horizontally elongated casing provided near the top thereof with a horizontal partition dividing the same into an upper shallow chamber and a lower comparatively deep chamber, electrical heating elements disposed in the two chambers and adapted to heat the upper chamber to a baking degree and the lower chamber to a lesser degree, an endless conveyor having a plurality of horizontal stretches and adapted to convey biscuit first continuously through the more highly heated portion of the upper chamber and then continuously through lower progressively less heated portions thereof and thereafter at first continuously through the more highly heated portion of the lower chamber and then continuously through lower progressively less heated portions thereof, said conveyor having a length in and a path through the lower chamber at least twice its length in and path through the upper chamber, said conveyor having a looped portion located without said casing and said lower chamber having a horizontal extension underlying said looped portion, said conveyer passing through said extension and emerging therefrom to said looped portion, and air circulation means for withdrawing air from one end of said lower chamber and reintroducing the same at the opposite end thereof through said horizontal extension.

In testimony whereof I affix my signature.

W. H. AYDELOTTE.